United States Patent
Wang et al.

(10) Patent No.: US 7,117,279 B2
(45) Date of Patent: Oct. 3, 2006

(54) KEYCODE PAGE SWITCHING APPARATUS AND METHOD FOR THE SAME

(75) Inventors: Chin Ping Wang, Hsintien (TW); Ken Chen, Taipei Hsien (TW); Cellia Yen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 406 days.

(21) Appl. No.: 10/268,949

(22) Filed: Oct. 11, 2002

(65) Prior Publication Data

US 2003/0221029 A1    Nov. 27, 2003

(30) Foreign Application Priority Data

May 23, 2002    (TW)    ............................... 91110927 A

(51) Int. Cl.
*G06F 13/12*    (2006.01)
*G09G 5/00*    (2006.01)
(52) U.S. Cl. ............................. 710/67; 345/172
(58) Field of Classification Search .................... 710/1, 710/2, 65, 67, 305; 345/168, 172; 341/22, 341/26
See application file for complete search history.

(56) References Cited

U.S. PATENT DOCUMENTS

| | | | | |
|---|---|---|---|---|
| 6,011,495 A * | 1/2000 | Chen | ............................. | 341/22 |
| 6,445,381 B1 * | 9/2002 | Chou | ............................. | 345/168 |
| 6,460,103 B1 * | 10/2002 | Powers et al. | ............... | 710/305 |
| 6,529,145 B1 * | 3/2003 | Lin | ............................. | 341/22 |
| 6,727,890 B1 * | 4/2004 | Andres et al. | ............... | 345/168 |
| 6,786,731 B1 * | 9/2004 | Williams | ..................... | 434/258 |

OTHER PUBLICATIONS

USB, Device Class Definition for Human Interface Devices (HID).*
USB, HID Usage Tables.*

* cited by examiner

*Primary Examiner*—Khanh Dang
(74) *Attorney, Agent, or Firm*—Rosenberg, Klein & Lee

(57) ABSTRACT

A keyboard with keycode page switching ability has at least one page switch key. The page switch key is operated to select one keycode page for the keyboard. A driver program of a computer connected to the keyboard will send a switching command to switch a keycode page for the keyboard after the page switch key is pressed. Therefore, user can select keycode page for the keyboard to expand the function of the keyboard.

5 Claims, 4 Drawing Sheets

KEYCODE PAGE SWITCHING APPARATUS AND METHOD FOR THE SAME

FIELD OF THE INVENTION

The present invention relates to a keycode page switching apparatus and method for the same, especially to a keycode page switching apparatus providing at least one page switch key on a keyboard to select a keycode page for the keyboard and method for the same.

BACKGROUND OF THE INVENTION

Keyboards are indispensable computer hardware for data and command input. Moreover, as the function of the computer becomes more diverse and powerful, the keyboard is provided extra function keys or hot keys for multimedia functions such as play, forward, rewind, volume up, volume down, e-mail and Internet . . . etc.

The above-mentioned functions are generally achieved by adding a prefix "E0" to the standard keycode of the keyboard to extend the function of the keyboard. However, this kind of keyboard uses exclusively the PS/2 interface.

Moreover, USB (Universal Serial Bus) is also a popular serial interface for keyboard and mouse with hot plug feature. Therefore, user can conveniently change peripherals with USB interface.

However, the keyboard with USB interface has limitation on certain function because of the definition of USB specification. For example, hot keys of some keyboards have two keycode pages selected by driver program, but the USB keyboard cannot select one keycode page from the two keycode pages. Therefore, the USB keyboard cannot be switched to vender defined page once the driver program is activated.

As can be seen from above description, the USB keyboard lacks of some function provided by the PS/2 keyboard, which is inconvenient to the user.

SUMMARY OF THE INVENTION

It is an object of the present invention to provide a keycode page switching apparatus and method, wherein the keycode of the keyboard can be switched by directly operating the keyboard with the help of driver program for expanding the function.

It is another object of the present invention to provide a keycode page switching apparatus and method, whereby the keys on the keyboard have two keycode pages or multiple keycode pages.

To achieve the above objects, the present invention provides a method for keycode page switching, wherein a keyboard has at least one keycode page switching key and electrically connected to a computer. The method comprises following steps: (a) pressing the page switch key; (b) a driver program of the computer sending a page switch command to the keyboard; and (c) the keyboard executing the page switch command. To achieve the above objects, the present invention provides a keyboard with keycode page switching function. A keyboard with keycode page switching ability is connected to a computer and has at least one page switch key. The keyboard has a keycode corresponding to a keycode page. The page switch key is pressed such that the computer can selectively switch a keycode page and the function of the keyboard can be expanded with the help of a driver program.

The various objects and advantages of the present invention will be more readily understood from the following detailed description when read in conjunction with the appended drawing, in which:

DETAILED DESCRIPTION OF THE INVENTION

Figure 1:
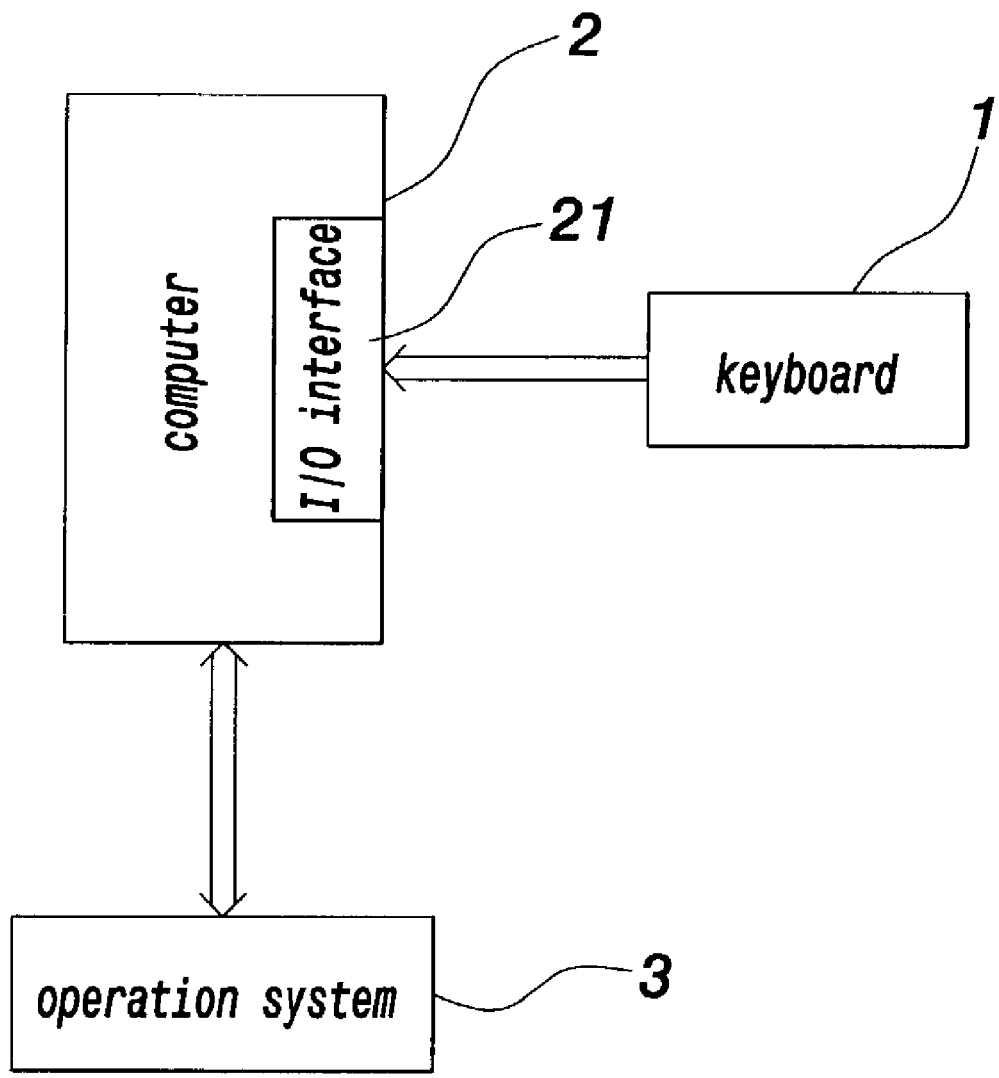
FIG. 1 shows the block diagram of the present invention.
Figure 2:
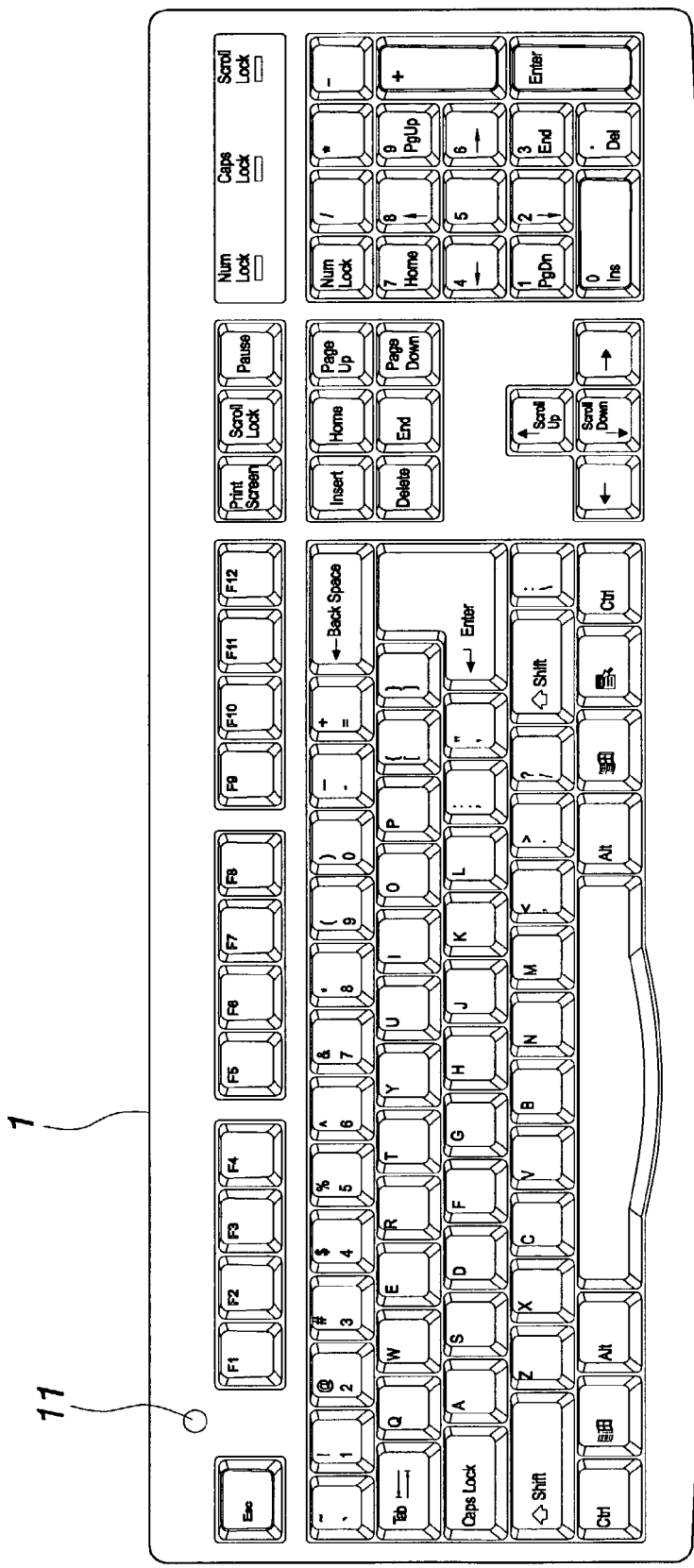
FIG. 2 shows a keyboard according to the present invention.

With reference to FIGS. 1 and 2, the keyboard 1 according to the present invention is connected to an I/O interface 21 of a computer 2 operated on an operation system 3. The keyboard 1 is a USB keyboard and has at least one page switch key 11 to switch among user pages defined by USB interface. The current user page of the keyboard 1 is referred to keycode page. More particularly, the page switch key 11 can switch the keycode page of the USB keyboard from 07 page for normal key or 0C page for hot key to one of the vender defined pages ff00-ffff, which are also defined by USB interface. The operation system 3 has USB supporting function and, for example, can be one of the Windows 98/ME/2000/XP, Mac Os and Linux. When the keyboard 1 according to the present invention is connected to the computer 2, the computer recognizes the page switching ability of the keyboard 1. Therefore, user can use the page switch key 11 to switch the keycode page of the USB keyboard with the help of the driver program.

Figure 3:
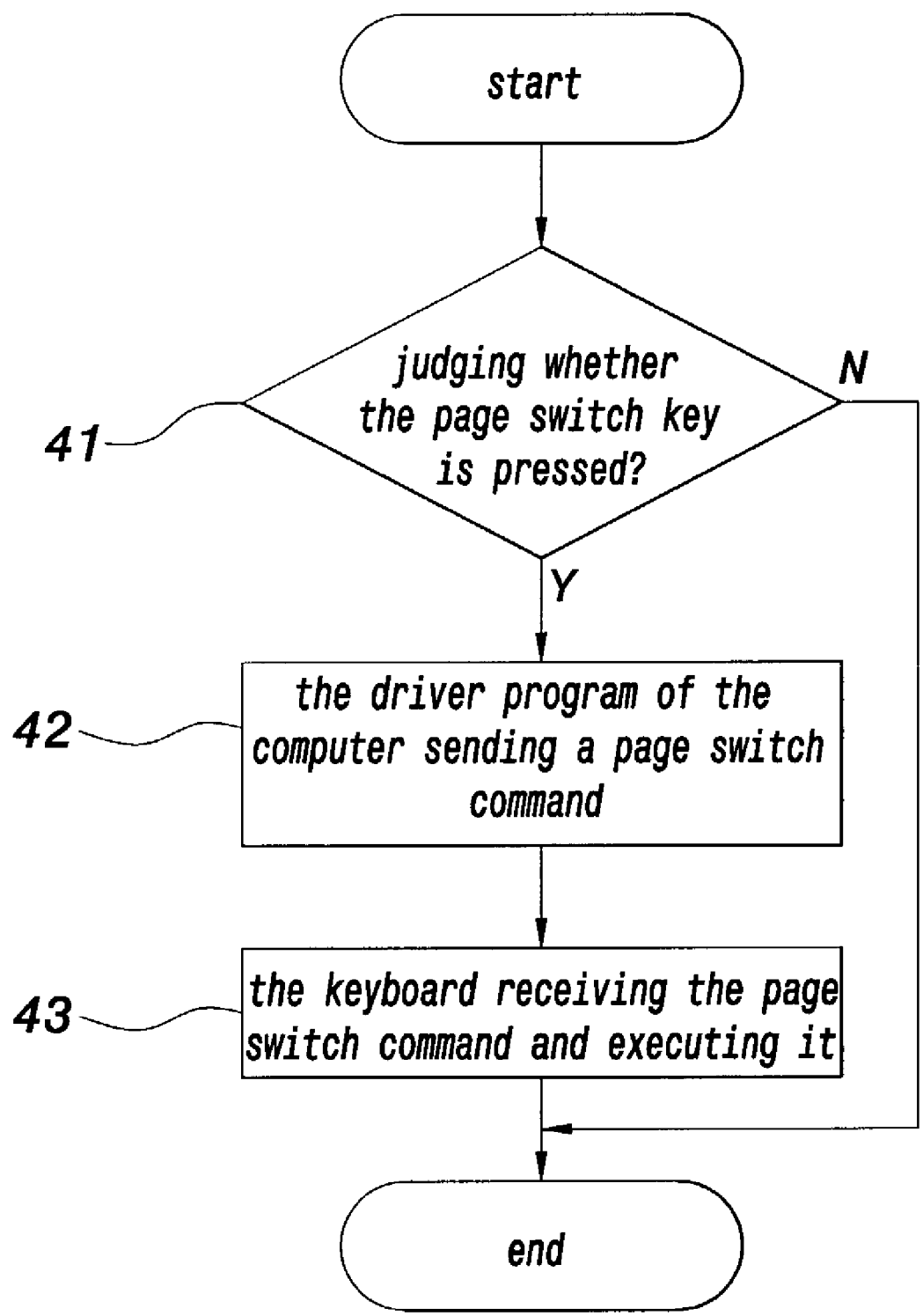
FIG. 3 shows the flowchart of the present invention.

FIG. 3 shows the flowchart of the present invention, which comprises following steps:
step 41: judging whether the page switch key is pressed? if true, going to step 42, else ending the procedure;
step 42: the driver program of the computer sending a page switch command;
step 43: the keyboard receiving the command and executing the command.

In step 41, the computer 2 receives a request to switch keycode page when the page switch key 11 is pressed. The driver program of the computer sends a page switch command to the keyboard 1 in step 42 and the report ID is modified in step 43, wherein the report ID is used for the computer 2 for identify the keycode page of the keyboard 1.

Figure 4:
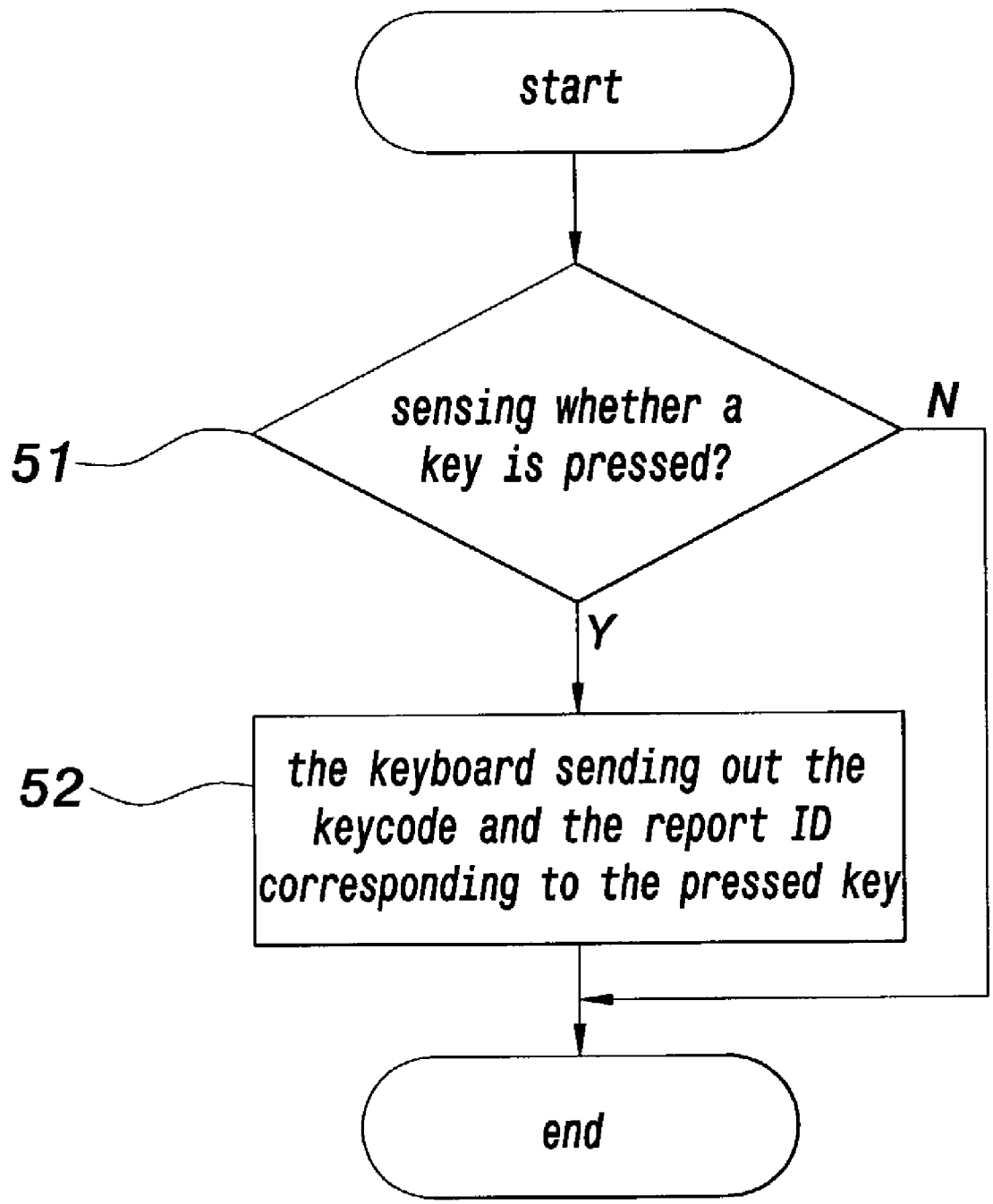
FIG. 4 shows the flowchart of the invention for demonstrating the keycode sending by keyboard.

FIG. 4 shows the flowchart of the invention for demonstrating the keycode sending by keyboard.
step 51: sensing whether a key is pressed? if true, going to step 52, else ending the procedure;
step 52: the keyboard sending a keycode and a report ID corresponding to the pressed key, and then ending the procedure.

The step 51 senses the keystroke of keys beside the page switch key 11. Once a keystroke is sensed, the keycode and the report ID corresponding to the key are sent to keyboard buffer and the driver program of the computer 2 can discriminate the keycode page corresponding to the pressed key. Therefore, the function of the key corresponding to the keycode page can be executed by the keystroke.

More particularly, the keys on the keyboard have functions corresponding to 07 page for normal key or 0C page for once the driver program of the computer is activated. If a user want to use expanded function of the key, he can switch the keycode page of the keyboard from 07 page for normal key (or 0C page for hot key) to one of the vender defined pages ff00-ffff and then the driver program converts the keycode corresponding to the selected page of the vender defined pages ff00-ffff to composite keycode accessible by operation system or application program. Alternatively, the driver program of the computer can convert the keycode in page of the vender defined pages ff00-ffff to Alt+numeric codes to generate special symbols. Therefore, the keyboard can be operated with standard function of USB keyboard provided by 07 page or 0C page, or with expanded function defined by USB interface in one of vender defined page ff00~ffff.

To sum up, the keycode page switching apparatus and method of the present invention have following advantages:

1. User can switch the keycode of the keyboard to other page by the page switch key.

2. The keycode page can be switched to one of the vender defined pages ff00-ffff to expand the function of the keyboard with the help of driver program.

Although the present invention has been described with reference to the preferred embodiment thereof, it will be understood that the invention is not limited to the details thereof. Various substitutions and modifications have been suggested in the foregoing description, and other will occur to those of ordinary skill in the art. For example, the keycode can be switched to other usage pages beside vender defined page ff00~ffff. Alternatively, multiple keycode switching keys can be provided and corresponding to different keycode pages. Therefore, all such substitutions and modifications are intended to be embraced within the scope of the invention as defined in the appended claims.

We claim:

1. A keycode page switching method for a keyboard connected to a computer through a USB interface comprising the following steps:

providing on the keyboard a page switching key for switching a keycode page through a keycode page switching function;

identifying at the computer the keyboard as having the keycode page switching function;

sending from the keyboard a page switching request to the computer through the USB interface responsive to activation of the page switch key;

sending from the computer a page switch command to the keyboard through the USB interface responsive to the page switching request being received; and executing at the keyboard the page switching function to switch the keycode page responsive to the page switch command; and sending from the keyboard subsequent to the page switching function being executed a key code of an activated keyboard key and an indication of the keycode page to which the keyboard is switched.

2. The keycode page switching method as in claim 1, further including the step of providing at the computer a driver executing under an operation system for sending the page switching command responsive to the page switching request.

3. The keycode page switching method as in claim 1, where the keycode sending step includes the step of modifying a report ID stored in the keyboard and sending to the computer the modified report ID as the indication of the keycode page.

4. The keycode page switching method as in claim 3, wherein the switched keycode page is one of a USB vender defined pages ff00-ffff.

5. The keycode page switching method as in claim 3, wherein the keycode page is switched from one of pages 07 and 0C defined by a USB specification.

* * * * *